United States Patent [19]

Smith

[11] Patent Number: 4,635,952

[45] Date of Patent: Jan. 13, 1987

[54] STEERING KNUCKLE AND KINGPIN ASSEMBLY

[75] Inventor: Joseph E. Smith, Birmingham, Mich.

[73] Assignee: V. W. Kaiser Engineering, Inc., Millington, Mich.

[21] Appl. No.: 731,557

[22] Filed: May 7, 1985

[51] Int. Cl.$^4$ ............................................. B62D 7/18
[52] U.S. Cl. ................................................. 280/96.1
[58] Field of Search ................. 280/93, 96.1, 96.2, 188/18; 29/447; 403/378

[56] References Cited

U.S. PATENT DOCUMENTS

| | | | |
|---|---|---|---|
| 2,806,712 | 9/1957 | Cottrell | 280/93 |
| 3,441,288 | 4/1969 | Boughner | 280/96.1 |
| 3,542,392 | 11/1970 | Cummings | 280/96.1 |
| 3,549,166 | 12/1970 | Moore | 280/96.1 |
| 3,801,124 | 4/1974 | Afanajor | 280/93 |
| 3,861,705 | 1/1975 | Burchard et al. | 280/93 |
| 4,076,345 | 2/1978 | Forster et al. | 280/96.1 |
| 4,229,017 | 10/1980 | Hagedorn | 280/96.1 |
| 4,286,799 | 9/1981 | Ayres | 280/96.1 |

Primary Examiner—Richard A. Bertsch
Attorney, Agent, or Firm—Hauke and Patalidis

[57] ABSTRACT

A motor vehicle steering knuckle and kingpin assembly comprising a kingpin fixedly mounted through the motor vehicle front axle or beam with the end portions of the kingpin projecting above and below the front axle or beam. A wheel spindle knuckle is pivotally mounted relative to the kingpin, the spindle knuckle having an upper yoke having a bore disposed around the kingpin upper end portion and a lower yoke having a bore disposed around the kingpin lower end portion, a bushing being installed in each of the yoke bores. The kingpin end portions have a frusto-conical peripheral surface and the yoke bushings have a cylindrical internal surface such that, under load, the bearing surfaces in engagement and capable of transmitting the load are along the whole length of the bearing surfaces. Alternatively, the kingpin end portions are provided with a peripheral cylindrical surface co-operating with an appropriate frusto-conical internal surface for the bushings. The invention also contemplates providing the kingpin end portions with a slightly spherical peripheral surface co-operating with yoke bushings having a cylindrical internal surface, or providing the kingpin end portions with a cylindrical peripheral surface co-operating with yoke bushings having an inversely spherical internal surface. Preferably, the kingpin end edges have a curved surface progressively blending with the peripheral surface of the kingpin end portions or, in structures where the kingpin end edges project beyond the bushing end edges, the bushing end edges are provided with a curved surface progressively blending with the internal surface of the bushings.

18 Claims, 13 Drawing Figures

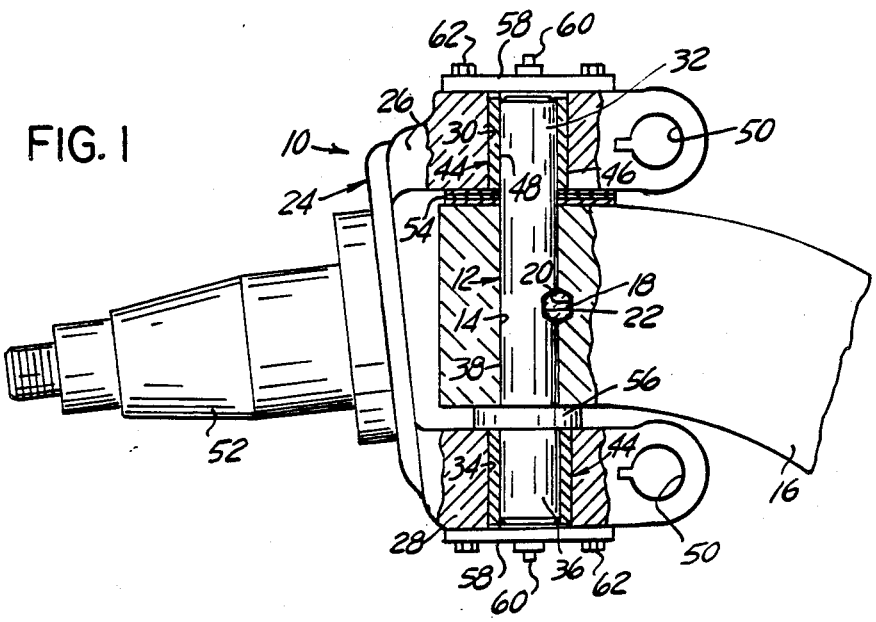

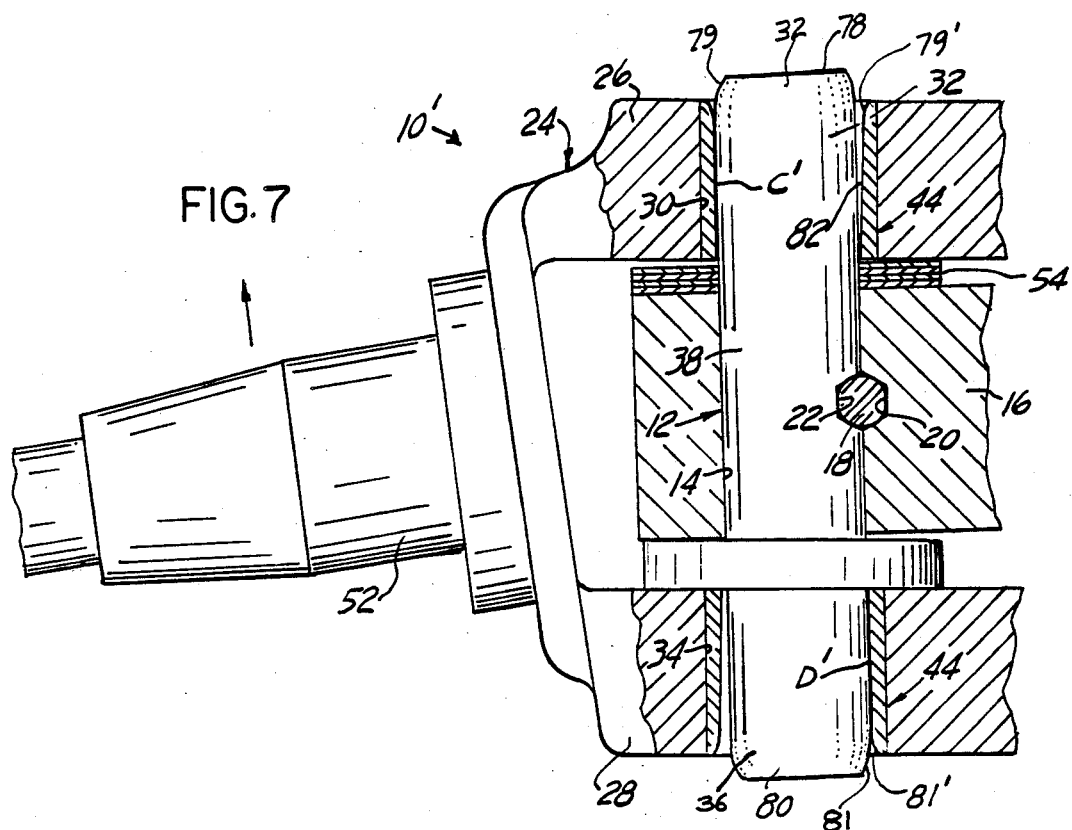
FIG. 7
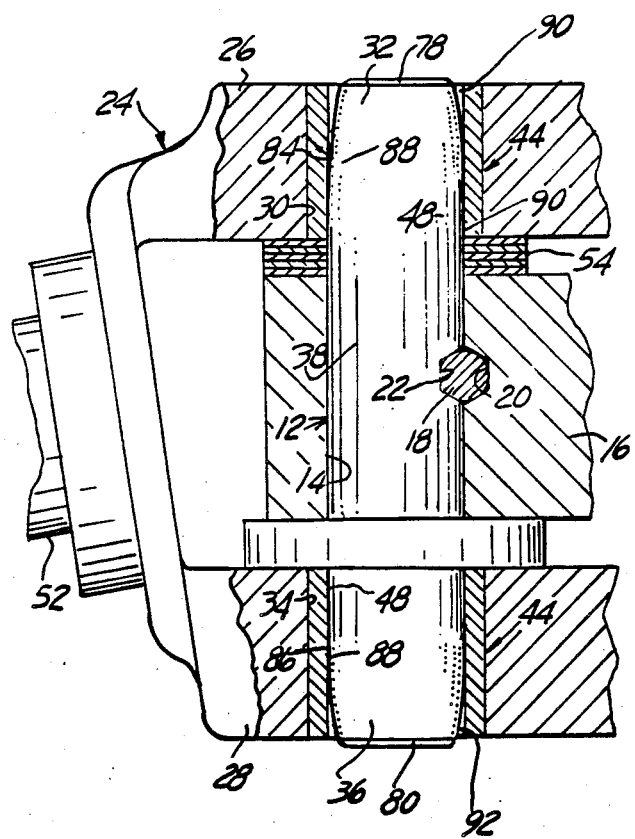
FIG. 8
FIG. 9

STEERING KNUCKLE AND KINGPIN ASSEMBLY

CROSS-REFERENCE TO RELATED APPLICATION

The present application is being filed contemporaneously with application Ser. No. 731,556 assigned to the same assignee.

BACKGROUND OF THE INVENTION

The present invention relates to steering knuckle and kingpin assemblies in general, and more particularly to steering kingpin and knuckle assemblies for heavy motor vehicles.

Steering knuckle and kingpin assemblies, used in heavy motor vehicles such as trucks and the like, consist generally of a circularly cylindrical kingpin fastened through a substantially vertical bore in opposite ends of the vehicle front axle, and of a wheel spindle knuckle pivotable relative to the kingpin. The knuckle has an integral upper yoke and an integral lower yoke that straddle the axle end and pivot relative to the kingpin ends projecting above and below the axle. Appropriate bushings are fixedly fitted in the yoke bores, and the bearing surfaces in engagement, namely the internal cylindrical surface of the yoke bushing and the corresponding cylindrical peripheral surface of the kingpin ends, are subjected to substantial and variable loads, vibrations and shock, which eventually cause excessive wear, requiring replacement of the bushings, or of the kingpin, or both, replacement kingpins and bushings being generally marketed in the form of a complete kit or set. It is not uncommon to replace heavy truck steering knuckle and kingpin assemblies several times during the useful life of the vehicle.

Because the road wheel mounted on the knuckle spindle supports a proportional portion of the weight of the vehicle, the kingpin is subjected to torque force in a substantially vertical plane through the intermediary of the knuckle yokes and bushings. The forces applied to the kingpin ends in opposite directions tend to cause engagement of a localized area of the peripheral surface at the top of the upper end portion of the kingpin with a corresponding localized area of the inner surface of the upper yoke bushing, and of a localized area of the surface of the bottom of the kingpin lower portion with a corresponding localized area of the inner surface of the lower yoke bushing. The bearing surfaces in mutual contact are not the designed cylindrical bearing surfaces of the kingpin ends and yoke bushings as, under load, there is only point contact or line contact between the bearing surfaces causing excessive compressive stress. The bearing surfaces are generally not of equal lengths. For example the edge of the kingpin ends may project beyond the end of the shackle yoke bushings or, alternatively, the edge of the bushings may project beyond the kingpin ends. When such conditions exist, the excessive compressive stress of the bearing surface areas in engagement is further aggravated by the edge effect resulting from the loads being transmitted from the bushing to the kingpin end peripheral surface, at the edge of the bushings in the structure wherein the kingpin ends project beyond the bushings, or at the edge of the kingpin ends in structures wherein the kingpin ends do not project beyond the bushings. The edge of the bearing member in engagement with the surface of the other bearing member causes an indentation of the surface of the other bearing member, and further elastic or plastic deformation of both members at the line of contact, thus adding a stress riser at the point or line of maximum loading of the bearing surface, with accompanying failure and piercing of the lubricant film, in turn causing rapid deterioration of the bearing surfaces and propagation of wear from abrasion and from contact corrosion.

SUMMARY OF THE INVENTION

The principal object of the present invention is to provide a structure for a motor vehicle steering knuckle and kingpin assembly which utilizes a greater bearing surface area in engagement between the kingpin peripheral surface and the knuckle bushing internal surface, such as to move uniformly distribute loads and stress on the bearing surfaces in engagement and reduce the pressure exerted on the lubricant film between the bearing surfaces.

The diverse objects and advantages of the present invention will become apparent to those skilled in the art when the following description of the best modes contemplated at the present for practicing the invention is read in conjunction with the accompanying drawing wherein like reference numerals refer to like or equivalent parts, and in which:

BRIEF DESCRIPTION OF THE DRAWING

FIG. 1 is a schematic illustration of an example of structure for a steering knuckle and kingpin assembly according to the prior art;

FIGS. 2 and 3 are views similar to FIG. 1, at an enlarged scale and in a grossly exaggerated manner to illustrate the inconveniences of steering knuckle and kingpin assemblies according to the prior art;

FIGS. 6 and 7 are views similar to FIG. 4 and FIG. 5, respectively, but illustrating another example of structure according to the present invention;

FIGS. 8 and 9 are views similar to FIGS. 6 and 7, respectively, and illustrating a further example of structure according to the present invention.

DETAILED DESCRIPTION OF THE PREFERRED EMBODIMENTS

Figure 3:
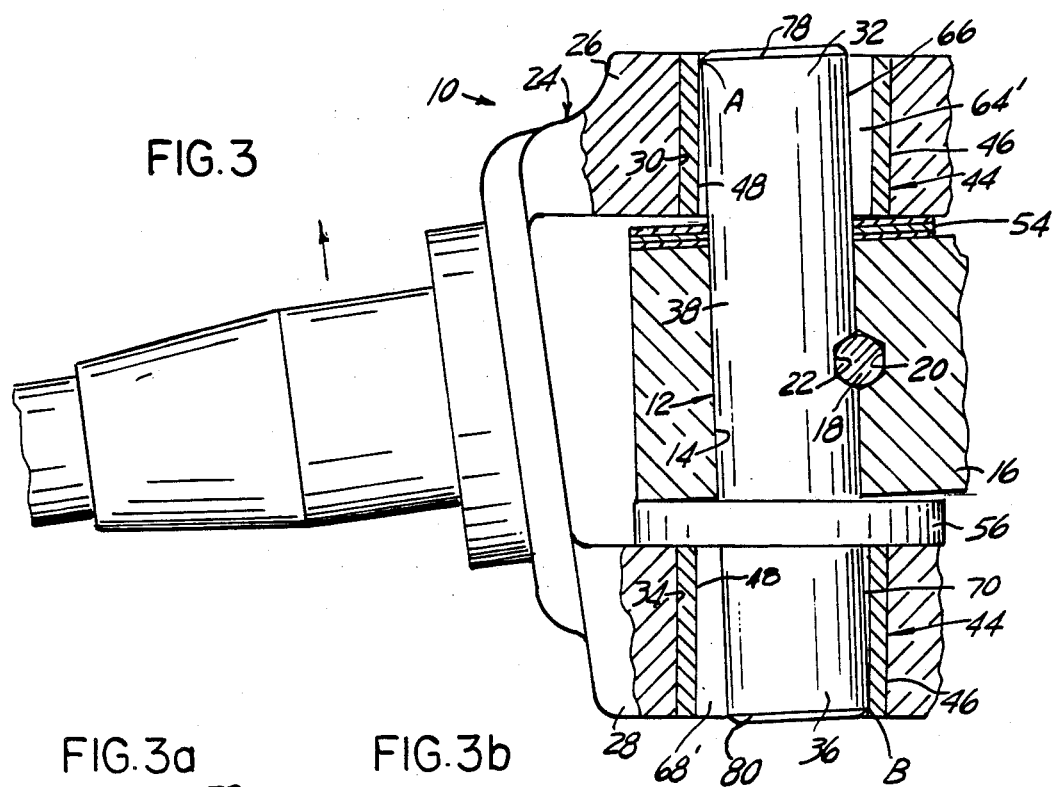

Referring to the drawing and more particularly to FIG. 1, there is illustrated a steering knuckle assembly 10 comprising a kingpin 12 mounted in a bore 14 in opposite ends of the rigid front axle or beam 16 of a motor vehicle, not shown, such as a heavy duty truck for example. The kingpin 12 is mounted through the bore 14 in the front axle or beam 16 at a slight angle to the vertical by means of a tapered lock pin 18 pressed through a tapered channel 20 through the axle or beam 16 and a corresponding straight notch 22 formed on the periphery of the kingpin 12. In this manner the kingpin 12 is held in the bore 14 against rotation and against vertical displacement along its longitudinal axis.

A wheel spindle knuckle 24 is pivotally mounted relative to the kingpin 12 by way of two integral upper and lower yoke members 26 and 28, the upper yoke member 26 having a bore 30 accepting the upper end portion 32 of the kingpin 12, while the lower yoke member 28 of the wheel spindle knuckle 24 is similarly provided with a bore 34 surrounding the kingpin lower end portion 36. The upper end portion 32 of the kingpin 12, the lower end portion 36 of the kingpin 12 and the intermediate portion 38 are circularly cylindrical and usually of equal diameters. A bearing or bushing 44 is disposed in the upper yoke bore 30 for pivotably supporting the upper yoke member 26 around the kingpin upper end portion 32, and a similar bearing or bushing 44 is disposed in the lower yoke bore 34 between the bore surface and the lower end portion 36 of the kingpin 12. The peripheral surface 46 of each bushing 44 is circularly cylindrical such as to fit in the bore 30 or 36, and the internal surface 48 of each bushing 44 is circularly cylindrical corresponding to the circularly cylindrical periphery of the end portions 32 and 36 of the kingpin 12.

Two wheel spindle knuckles 24, one on each end of the axle or beam 16, are coupled for simultaneous pivoting by an appropriate tie rod, not shown, generally provided with a ball and socket joint at each end, the ball, for example, having a stud fastened through an appropriate opening 50 in one of the yoke members, while another tie rod displaced by the steering mechanism of the vehicle, not shown, is attached at its end by way of a stud fastened through another opening 50 disposed in the other yoke member.

The upper and lower yoke members 26 and 28 are integral parts of a single-piece forging, for example, and they form a generally U-shaped member supporting the spindle 52 of a steerable road wheel, not shown. A plurality of annular spacers shims 54 are mounted around the kingpin 12 where it projects on the top of the axle or beam 16 to provide appropriate clearance between the upper yoke member 26 and the axle or beam 16, while an annular thrust bearing 56 is disposed around the kingpin 12 where it projects below the axle or beam 16, the thrust bearing 56 transmitting the load from the axle or beam 16 to the lower yoke portion 28. The upper end of the upper yoke bore 30 is closed by a cap 58, provided at its center with a one-way check valve 60 and fastened on the edge of the upper yoke member 26 by means of bolts, such as bolts 62. The end of the lower yoke bore 34 is similarly closed by an end cap 58 also provided with a one-way check valve 60. The check valves 60 permit to observe visually the escape of lubricant introduced through grease fittings, not shown, permitting to lubricate the kingpin end portions 32 and 36 and the bearing surface of the bushings 44. When lubricant is observed to flow through the check valves 60, it is an indication that the knuckle-kingpin assembly has been fully lubricated. Alternatively, in some structures, the check valves 60 are omitted and replaced by grease fittings through which lubricant is inserted into the knuckle-kingpin assembly.

Referring now to FIG. 2, which is an enlarged view of the structure shown at FIG. 1, in a grossly exaggerated manner, and with the end caps 58 omitted for the sake of clarity, an annular clearance space 64 normally exists between the cylindrical peripheral surface 66 of the kingpin upper end 32 and the internal cylindrical surface 48 of the upper yoke bushing 44, and a similar annular clearance 68 exists between the cylindrical peripheral surface 70 of the kingpin lower end 36 and the cylindrical internal surface 48 of the lower yoke bushing 46. The radial clearance 64 or 68 which conventionally is in the range of 0.001 to 0.003 in. (0.025-0.762 mm), and which is shown grossly exaggerated in the drawing, allows the steering knuckle 24 to pivot relative to the kingpin 12 without binding, and permit the establishment of a lubricating film, such as a grease film, between the bearing surfaces. FIG. 2 illustrates the steering kingpin and knuckle assembly 10, assuming no load being applied to the kingpin end portions 32 and 36 by the knuckle 24, such that the bearing surfaces of the kingpin end portions 32 and 36 and of the yoke bushings 44 are disposed substantially concentric to one another, with the clearance annular spaces 64 and 68 of equal constant thickness between the peripheral surface 66 of the kingpin upper end portion 32 and the internal surface 48 of the upper yoke bushing 44 and between the peripheral surface 70 of the kingpin lower end portion 36 and the internal surface 48 of the lower yoke bushing 44.

Under static load, FIG. 3, with a portion of the weight of the vehicle being applied to the ground through the road wheel, not shown, mounted on the spindle 52, a twisting force is applied on the steering knuckle 24 from the wheel spindle 52 in the direction of the arrow. The twisting force causes surface engagement between a narrow surface area at the top edge 78 of the peripheral surface 66 of the kingpin upper end portion 32 and a corresponding area at or proximate the top edge of the internal surface 48 of the upper yoke bushing 44, as designated at A. The engagement between the respective surfaces is for all practical purpose point contact, that becomes a circular line engagement during steering, which results in expelling from between the bearing surfaces in engagement the film of lubricating grease and causes direct metal to metal contact. From a regular annular clearance space 64, FIG. 2, the clearance space becomes askew as shown at 64'. Similarly, the lower annular clearance space 68 becomes askew, as shown at 68', and a point contact is established between the peripheral surface 70 at the bottom edge 80 of the lower kingpin end 36 and the corresponding internal surface 48 at the edge of the lower yoke bushing 44 as designated at B. The point contact areas carry the whole static load and, during pivoting of the steering knuckle 24 around the kingpin 12 in the course of steering the vehicle, the circular line contact areas continuously wear and abrade one another, such wear and abrading being further increased in the course of dynamic load variations in practical usage of the vehicle. Even while at rest, contact corrosion takes place between the surfaces in engagement.

The relatively small surface areas in engagement resulting in excessive pressure being applied on the lubricating film, or grease film, which is thus pierced, cause dry bearing surfaces to rub against one another, and may exceed the compressive yield strength of the material used for making the bushings 44. In addition, the stress force applied upon the kingpin 12 is applied principally at the extreme end of the kingpin end portions 32 and 36, which tends to bend the kingpin in a generally S-shape, the points A and B of application of the forces being diametrically opposed.

Figures 3A, 3B:
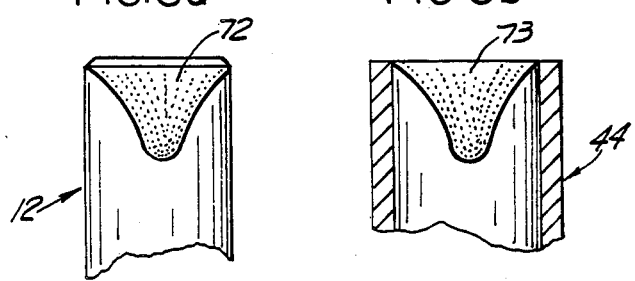
FIGS. 3(a) and 3(b) are partial views of respectively a kingpin end and a corresponding knuckle yoke bushing, according to the structure of FIGS. 1–3, and illustrating the wear pattern thereon.

The result is that there is rapid deterioration of the bushings 44 and of the kingpin 12 itself, which rapidly creates excessive play in the steering mechanism and requires replacement of the failed kingpin and steering knuckle yoke bushings. The wear pattern, as illustrated at 72, FIG. 3(a), and at 73, FIG. 3(b), for respectively the kingpin end and the bushing end edge, extend only over a small surface area of respectively the kingpin peripheral surface and the bushing internal surface, but nevertheless require that the components be replaced.

Figure 4:
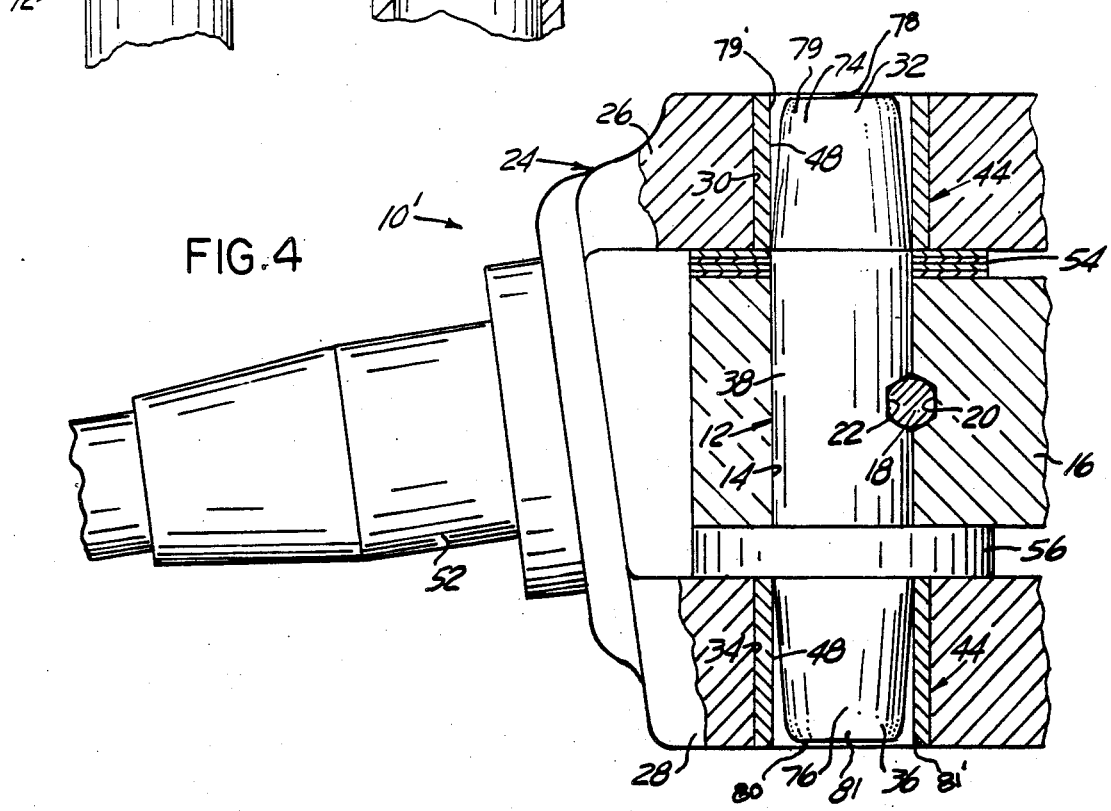
FIGS. 4 and 5 are views similar to FIG. 2 and FIG. 3, respectively, and schematically illustrating an example of structure according to the present invention.
Figure 5:
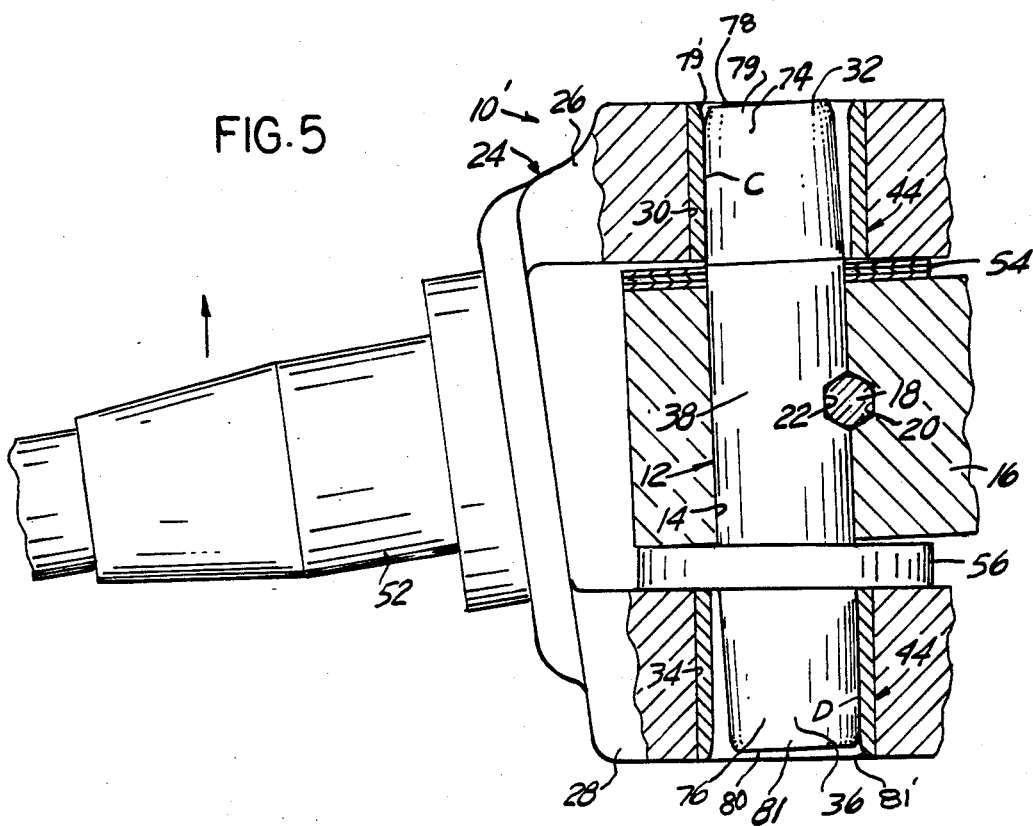

The edge effect initiating the wear pattern of conventional heavy duty steering kingpin and knuckle assemblies is eliminated, according to the present invention, by providing the kingpin end portions 32 and 36 with an appropriate taper or frusto-conical shape, shown in a grossly exaggerated fashion at FIG. 4, which represents an improved structure for a steering kingpin and knuckle assembly in an unloaded condition. The end portions 32 and 36 of the kingpin 12 are therefore provided with peripheral tapered or frusto-conical surfaces 74 and 76 of a diameter larger at their junction with the kingpin main cylindrical portion 38 mounted in the bore 14 of the axle 16, and which progressively and linearly decreases to a smaller diameter proximate the extreme end edge 78 of the kingpin upper end portion 32 and 80 of the kingpin lower end portion 36. Such difference in diameters is very small and, for all practical purposes, amounts to a difference between the larger diameter and the smaller diameter of each kingpin end portions 32 and 36 in the range of 0.001 to 0.006 in (0.025 to 0.15 mm). The corresponding bushings 44 in the upper yoke bore 30 and lower yoke bore 34 are provided with a circularly cylindrical internal surface 48, in the example of structure illustrated at FIG. 4, such that under normal static load, FIG. 5, the peripheral tapered surface, or frusto-conical surface 74, of the kingpin upper end portion 32 tends to engage the upper yoke bushing internal surface 48 in line contact over the whole length of the kingpin end portion 32 and over the whole length of the bushing internal surface 48, as shown, an appropriate substantially wedge-shaped grease film being substantially uniformly distributed between the bearing surfaces. Because of the substantially even load distribution between the bearing surfaces along the full line length of the bearing surfaces, as shown at C with respect to the kingpin upper end portion 32 and upper yoke bearing 44, and as shown at D with respect to the kingpin lower end portion 36 and lower yoke bushing 44, the grease film is capable of sustaining a considerable load without being pierced, as is the case with point or infinitely small area engagement. The result is that a steering knuckle and kingpin assembly 10' according to the structure of FIGS. 4–5 is endowed with a much longer service life than results from the conventional structure 10 of FIGS. 2–3.

Figure 6:
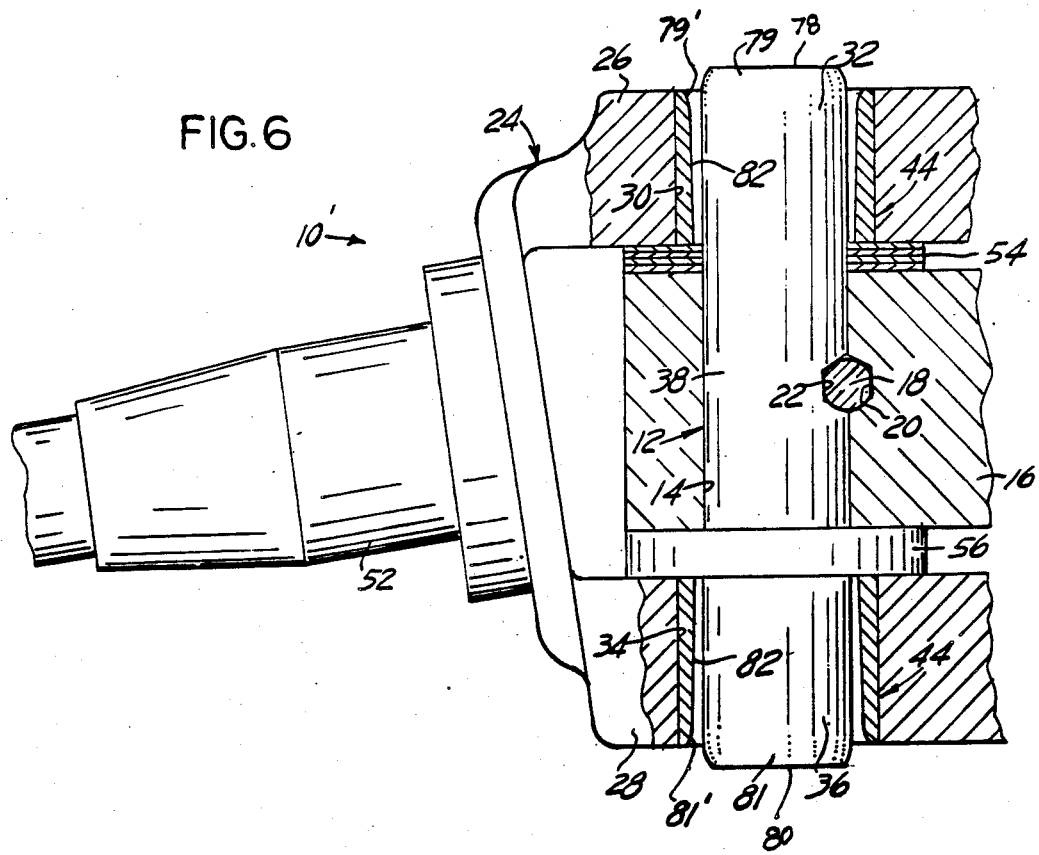

Alternatively, instead of providing the kingpin 12 with tapered end portions the kingpin end portions 32 and 36 may be left circularly cylindrical, FIG. 6, and the yoke bushings 44 provided with tapered, or frusto-conical, internal surfaces 82. The larger diameter of the upper yoke bushing bore surface 82 is larger at its top than at its bottom, while the inner diameter of the bore surface 82 of the lower yoke bushing 44 is larger at its lower end than at its upper end, the difference in diameters being of the same order as the difference in diameters of the kingpin ends of the structure of FIGS. 4–5. By providing a straight cylindrical kingpin 12 cooperating with internally tapered yoke bushings 44, under load the areas of bearing surfaces in engagement are also distributed over the whole length of the peripheral surface of the kingpin end portions 32 and 36 and the whole length of the corresponding surface of the upper and lower bores 82 of the yoke bushings, as shown at C' and D' at FIG. 7.

It will be appreciated that, instead of providing a combination of tapered kingpin end portions and straight cylindrical yoke bushings, or of a straight kingpin end portions and tapered yoke bushings, both the kingpin end portions and the yoke bushing bores may be provided with opposite tapers.

It is well understood that when under load, bearing surfaces are normally subjected to elastic deformation. The degree of elastic deformation is dependent upon the modulus of elasticity of the material used for the components forming the bearing surfaces in mutual engagement. The present invention contemplates taking advantage of elastic deformation of the kingpin peripheral bearing surface and of the yoke bushing internal bearing surface to eliminate the wear edge effect of conventional steering knuckle yoke bushing and kingpin asssemblies and to increase the areas of bearing surfaces in engagement under normal load.

Referring back to FIG. 3, the edge effect causes uneven wear of the internal surface 48 of the upper yoke and lower yoke bushings 44 or, in the alternative, of the kingpin upper end portion peripheral surface 66 and kingpin lower end portion peripheral surface 70 proximate their upper and lower edges, according to whether the edge of the kingpin end portions 32 and 36 is disposed beyond or short of the corresponding end edge of the corresponding bushing 44. If, for example, the kingpin upper end portion 32 is shorter than the upper yoke bushing 44, the edge of the kingpin upper end portion 32 in point contact at point A with the internal surface 48 of the bushing eventually forms an annular groove in the portion of the internal surface 48 of the upper yoke bushing 44 proximate the top edge thereof, resulting from continuous rubbing of the relatively sharp edge 78 of the kingpin end portion 32 against the internal surface 48 of the bushing. If the kingpin end portion 32 projects beyond the edge of the upper yoke bushing 44, the edge of the bushing wears a groove in the peripheral surface 66 of the kingpin upper end portion 32, proximate its top edge. Although described in relation to the upper kingpin end portion 32 and corresponding upper yoke bushing 44, the edge effect also takes place, in a diametrically opposed location, with respect to the edge 80 of the kingpin lower end portion 36 and corresponding lower yoke bushing 44.

Such edge effect is entirely eliminated by providing the ends of the kingpin end portions 32 and 36 in the structures illustrated at FIGS. 4–5 when the kingpin end portions are shorter than their corresponding yoke bushings 44, with a smoothly blending radiused edge 79 and 81, respectively, rather than with the conventional beveled edge creating the sharp edges 78 and 80 of the conventional structure of FIGS. 2–3. In the structure of FIGS. 6–7, which has been arbitrarily shown for illustrative purpose as having kingpin end portions projecting beyond the yoke bushings 44, the edge effect has been eliminated by providing the end edges of the bushings 44 with a smoothly blending radiused edge as shown at 79' and 81', which prevents line engagement and eventual gouging of the peripheral surface of the kingpin ends by the bushing otherwise sharp edge.

It will be appreciated that in all the structures disclosed and illustrated herein, the kingpin end portions 32 and 36 and the bushings 44 may be routinely provided with smoothly blending radiused edges, notwithstanding the relative lengths of the bearing members. It will be further appreciated that, although referred to as being radiused edges, the progressively and smoothly blending end edges 79 and 81 of the kingpin 12 are preferably in the form of a truncated ellipsoid or paraboloid rather than in the form of a spherical zone, such that the curved surface blends progressively into the cylindrical surface of the kingpin end portions 32 and 36 with practically no line of demarcation. Similarly, although referred to as being radiused edges, the progressively and smoothly blending end edges 79' and 81' of the bushings 44 are preferably formed as reciprocal, or inverse, ellipsoidal or paraboloidal surfaces rather than formed as a reciprocal, or inverse, spherical zone surface, such that the curved surface blends progressively into the cylindrical internal surface of the bushings 44 with practically no line of demarcation.

The edge effect is also eliminated by the structure illustrated at FIG. 8, as a result of providing the upper and lower kingpin end portions 32 and 36 with a particular geometry, shown in grossly exaggerated manner for illustrative purpose. The kingpin upper end portion 32 and lower end portion 36, instead of being absolutely circularly cylindrical, are slightly barrel-shaped, or spherically shaped, the radius of the sphere being very large such as a radius of several meters for example, with the result that the middle area of the kingpin upper and lower end portions 32 and 36, as shown at 84 and 86, respectively, is capable of static linear engagement with a corresponding area 88 of the internal cylindrical surface 48 of respectively the upper yoke and lower yoke bushing 44, with an appropriate grease film interposed between the bearing surfaces, and that there is a wedge-shaped annular clearance space, as shown respectively at 90 and 92, beyond the kingpin end portions bulging areas 84 and 86.

Under load, FIG. 9, the large radius spherical surfaces of the kingpin upper end portion 32 and lower end portion 36 tend to pivot in a vertical plane axis relative to their respective upper and lower yoke bushings 44, the relative wedge-shaped clearance spaces 90 and 92 preventing nevertheless edge engagement between the kingpin end portion edges 78 and 80, even if provided with a bevel, as shown, and the internal cylindrical surface 48 of the bushings 44, proximate their end edge, in the event that the kingpin end edges are disposed lower than the bushing edges, and vice-versa in the event that the kingpin upper and lower end portions 32 and 36 have their edge disposed beyond the end edges of the corresponding bushings 44. In addition, elastic deformation of the bearing surfaces under load increases the areas in mutual engagement, FIG. 9, with the film of grease interposed between the bearing surfaces, and there is a tendency for the spherical surface of the kingpin end portions 32 and 36 and for the cylindrical internal surfaces 48 of the yoke bushings 44 to elastically conform with each other, as shown at 94, with the result that the relatively large bearing areas are apt to carry the static load and the dynamic loads without breaking through the film of grease. Wear that may eventually take place further increases the surface areas in mutual bearing engagement, although also causing a proportional increase in play.

Figure 10:
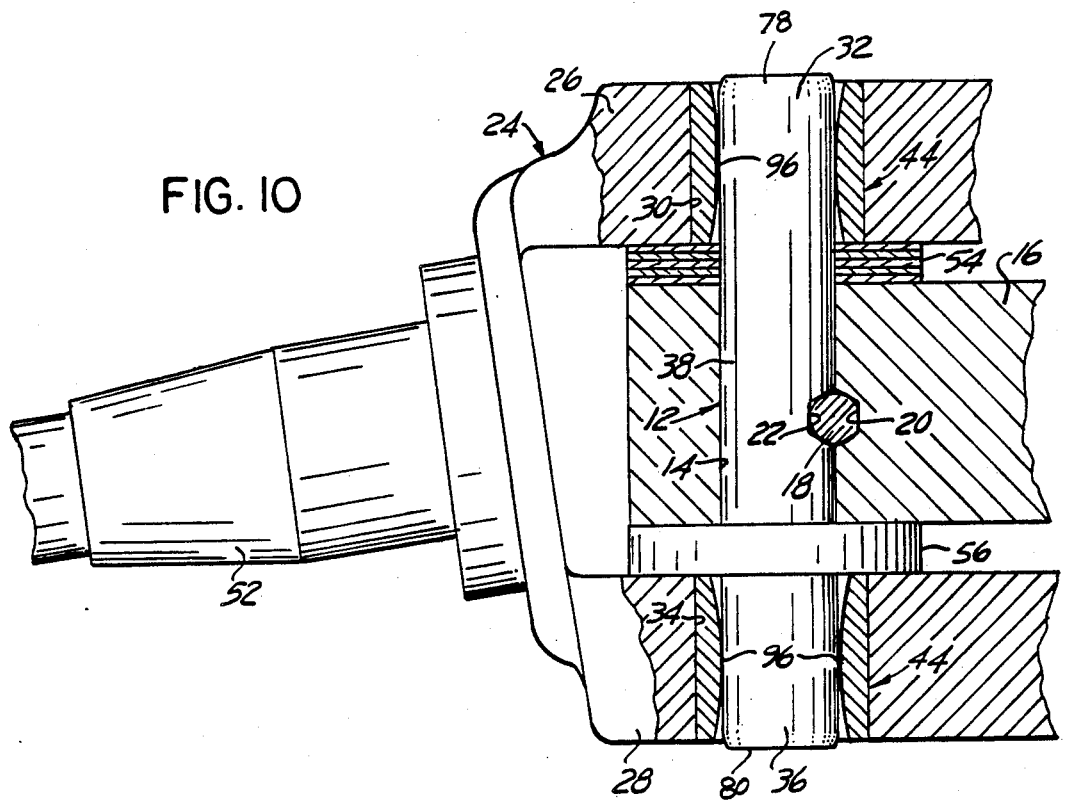
FIGS. 10 and 11 are views similar to FIG. 8 and FIG. 9, respectively, and illustrating another example of structure according to the present invention.
Figure 11:
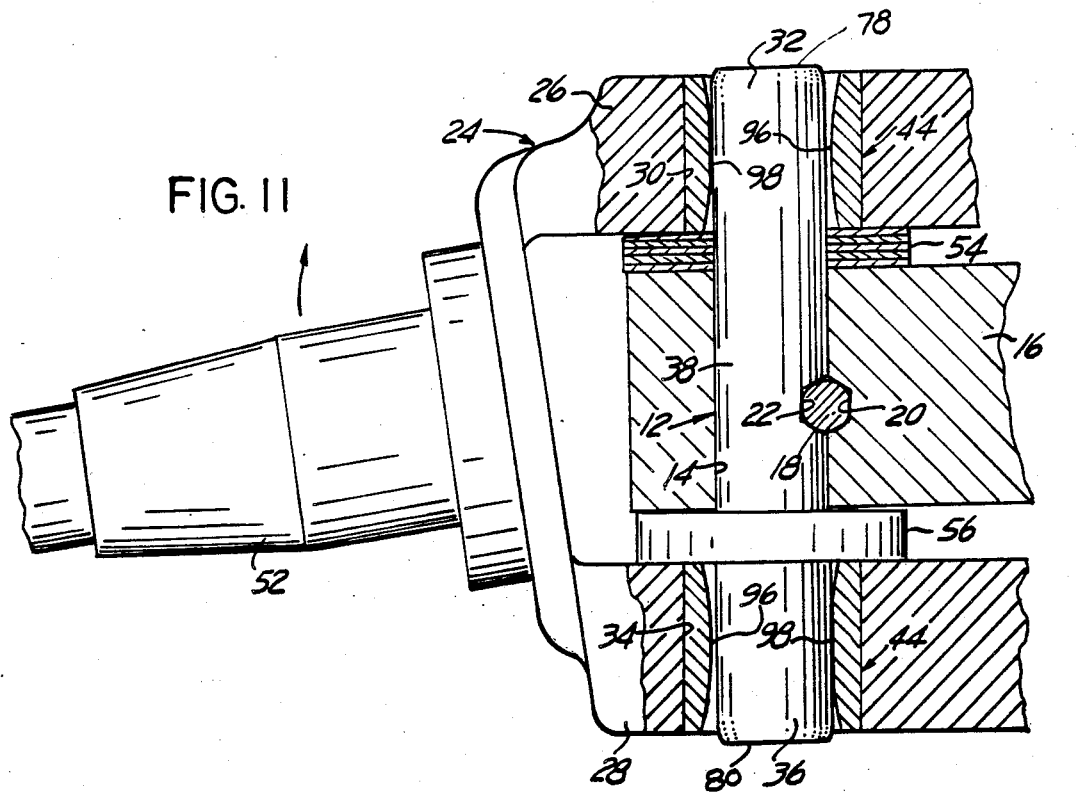

The same results are achieved by providing the kingpin 12 with circularly cylindrical end portions 32 and 36 and forming the yoke bushings 44 with an internal bore having an inverse barrel shape, as shown at 96 at FIG. 10, that tends to flatten under load through elastic deformation, as shown at 98 at FIG. 11, or by combining barrel-shaped kingpin end portions with inversely barrel-shaped yoke bushings.

Having thus described the present invention by way of examples of structures given for illustrative purpose only, modification whereof will be apparent to those skilled in the art, which is claimed as new is as follows:

1. In a steering knuckle and kingpin assembly comprising a kingpin, means for fixedly supporting said kingpin, said kingpin having an upper end portion and a lower end portion, a wheel spindle knuckle pivotally mounted relative to said kingpin, said knuckle having an integral upper yoke having a bore disposed around said kingpin upper end portion and an integral lower yoke having a bore disposed around said kingpin lower end portion, a bushing disposed in said bore in said upper yoke, a bushing disposed in said bore in said lower yoke, said kingpin end portions having a peripheral surface and said bushings having an internal surface defining mutual bearing surfaces, the improvement comprising at least one of said kingpin end portions having a peripheral surface of predetermined shape and an associated bushing having an internal surface of a second predetermined shape non-conforming with said first predetermined shape, whereby when a load is supported by said steering knuckle and kingpin assembly, said non-conforming shapes cause mutual bearing surface engagement of a relatively large area.

2. The improvement of claim 1 wherein said bushing internal surface is cylindrical and said kingpin end portion peripheral surface is frusto-conical with a diameter progressively decreasing towards the end of said kingpin end portion.

3. The improvement of claim 1 wherein said kingpin end portion has a cylindrical peripheral surface and said bushing has a frusto-conical internal surface with a diameter progressively increasing towards the end of said bushing.

4. The improvement of claim 1 wherein said kingin end portion has a spherical peripheral surface and said bushing has a cylindrical internal surface.

5. The improvement of claim 1 wherein said kingpin end portion has a cylindrical peripheral surface and said bushing has an inversely spherical internal surface of larger diameter at each end of said bushing than at the midsection of said bushing.

6. In a steering knuckle and kingpin assembly comprising a kingpin, means for fixedly supporting said kingpin, said kingpin having an upper end portion and a lower end portion, a wheel spindle knuckle pivotally mounted relative to said kingpin, said knuckle having an integral upper yoke having a bore disposed around said kingpin upper end portion and an integral lower yoke having a bore disposed around said kingpin lower end portion, a bushing disposed on said bore in said upper yoke, a bushing disposed in said bore in said lower yoke, said kingpin end portions having a peripheral surface and said bushings having an internal surface defining mutual bearing surfaces, the improvement comprising at least one of said kingpin end portions having an end edge comprising a curved surface progressively blending with the peripheral surface of said kingpin end portion, whereby when a load is supported by said steering knuckle and kingpin assembly causing said kingpin end edge to engage the internal surface of the bushing the bearing surfaces in mutual engagement have a relatively large area.

7. The improvement of claim 6 wherein said bushing internal surface is cylindrical and said kingpin end portion peripheral surface is frusto-conical with a diameter progressively decreasing towards the end of said kingpin end portion.

8. The improvement of claim 6 wherein said kingpin end portion has a cylindrical peripheral surface and said bushing has a frusto-conical internal surface with a diameter progressively increasing towards the end of said bushing.

9. The improvement of claim 6 wherein said kingpin end portion has a spherical peripheral surface and said bushing has a cylindrical internal surface.

10. The improvement of claim 6 wherein said kingpin end portion has a cylindrical peripheral surface and said bushing has an inversely spherical internal surface of larger diameter at each end of said bushing than at the midsection of said bushing.

11. The improvement of claim 6 wherein said curved surface is the surface of a spherical zone.

12. The improvement of claim 6 wherein said curved surface is the surface of a truncated ellipsoid.

13. The improvement of claim 6 wherein said curved surface is the surface of a truncated paraboloid.

14. In a steering knuckle and kingpin assembly comprising a kingpin, means for fixedly supporting said kingpin, said kingpin having an upper end portion and a lower end portion, a wheel spindle knuckle pivotally mounted relative to said kingpin, said knuckle having an integral upper yoke having a bore disposed around said kingpin upper end portion and an integral lower yoke having a bore disposed around said kingpin lower end portion, a bushing disposed in said bore in said upper yoke, a bushing disposed in said bore in said lower yoke, said kingpin end portions having a peripheral surface and said bushings having an internal surface defining mutual bearing surfaces, the improvement comprising at least one of said bushings having an end edge comprising a curved surface progressively blending with the internal surface of said bushing, whereby when a load is supported by said steering knuckle and kingpin assembly causing said bushing end edge to engage the peripheral surface of the kingpin end portion the bearing surfaces in mutual engagement have a relatively large area.

15. The improvement of claim 14 wherein said bushing internal surface is cylindrical and said kingpin end portion peripheral surface is frusto-conical with a diameter progressively decreasing towards the end of said kingpin end portion.

16. The improvement of claim 14 wherein said kingpin end portion has a cylindrical peripheral surface and said bushing has a frusto-conical internal surface with a diameter progressively increasing towards the end of said bushing.

17. The improvement of claim 14 wherein said kingpin end portion has a spherical peripheral surface and said bushing has a cylindrical internal surface.

18. The improvement of claim 14 wherein said kingpin end portion has a cylindrical peripheral surface and said bushing has an inversely spherical internal surface of larger diameter at each end of said bushing than at the midsection of said bushing.

* * * * *